US009810195B2

(12) United States Patent
Natanzi et al.

(10) Patent No.: US 9,810,195 B2
(45) Date of Patent: Nov. 7, 2017

(54) TURBINE WITH RADIAL INLET AND OUTLET AND MULTI-ELEMENT GUIDE VANES FOR OSCILLATING FLOWS

(71) Applicant: DRESSER-RAND COMPANY LTD., Werrington Parkway, Peterborough, Cambridgeshire (GB)

(72) Inventors: Shahab Natanzi, Peterborough (GB); Ben Tarver, Bedfordshire (GB)

(73) Assignee: Dresser-Rand Company, Olean, NY (US)

( * ) Notice: Subject to any disclaimer, the term of this patent is extended or adjusted under 35 U.S.C. 154(b) by 389 days.

(21) Appl. No.: 14/431,387

(22) PCT Filed: Oct. 2, 2013

(86) PCT No.: PCT/GB2013/052565
§ 371 (c)(1),
(2) Date: Mar. 26, 2015

(87) PCT Pub. No.: WO2014/053830
PCT Pub. Date: Apr. 10, 2014

(65) Prior Publication Data
US 2015/0233339 A1 Aug. 20, 2015

Related U.S. Application Data

(60) Provisional application No. 61/708,908, filed on Oct. 2, 2012.

(51) Int. Cl.
*F03B 13/14* (2006.01)
*F03B 13/22* (2006.01)
(Continued)

(52) U.S. Cl.
CPC ............ *F03B 13/142* (2013.01); *F03B 3/126* (2013.01); *F03B 3/18* (2013.01); *F03B 11/02* (2013.01); *F03B 13/22* (2013.01)

(58) Field of Classification Search
CPC ..................................................... F03B 13/142
See application file for complete search history.

(56) References Cited

U.S. PATENT DOCUMENTS

| 1,900,144 | A | * | 3/1933 | White | F03B 3/183 415/163 |
| 3,210,045 | A | * | 10/1965 | Lindquist | F03B 3/183 415/164 |

(Continued)

FOREIGN PATENT DOCUMENTS

| AU | 2011216558 A1 | 9/2012 |
| JP | 2011074854 A | 4/2011 |

(Continued)

OTHER PUBLICATIONS

AU 2013326306—IP Australia, Examination report No. 1 for standard patent application, dated Feb. 21, 2017, 3 pages.

(Continued)

*Primary Examiner* — Woody Lee, Jr.

(57) ABSTRACT

An oscillating water column (OWC) turbine and method of extracting energy therefrom is provided. The OWC turbine includes a shaft (101) rotatable about a central axis (103), and first and second ports (112, 114) disposed around the central axis. A flow passage (104) extends radially-inward from the ports and extends axially therebetween. Rotor blades (120) are coupled to the shaft, intersect the flow passage, and are offset from the central axis by a first distance. First guide vanes (116) intersect the flow passage and are disposed proximal the first port. The first guide vanes (116) include first and second stators (116a, b), the first stators (116a) being positioned between the first port (112) and the second stators (116b). Second guide vanes (118) intersect the flow passage and are disposed proximal the (Continued)

second port. The first and second guide vanes are offset from the central axis by a second distance that is greater than the first distance.

20 Claims, 4 Drawing Sheets

(51) Int. Cl.
*F03B 11/02* (2006.01)
*F03B 3/12* (2006.01)
*F03B 3/18* (2006.01)

(56) References Cited

U.S. PATENT DOCUMENTS

| | | | | |
|---|---|---|---|---|
| 3,922,739 | A | * | 12/1975 | Babintsev ............... B63B 51/02 290/42 |
| 4,385,492 | A | * | 5/1983 | Lee ........................ F01D 1/023 60/398 |
| 9,371,815 | B2 | * | 6/2016 | Franco de Oliveira Falcao ...................... F03B 3/12 |
| 2010/0209236 | A1 | * | 8/2010 | Freeman .................. F01D 1/02 415/208.1 |

FOREIGN PATENT DOCUMENTS

| | | | |
|---|---|---|---|
| WO | WO 2011050229 A2 * | 4/2011 | ............ F03B 13/142 |
| WO | 2011102746 A4 | 8/2011 | |
| WO | 2011119144 A1 | 9/2011 | |

OTHER PUBLICATIONS

PCT/GB2013/052565—European Patent Office, International Search Report, dated Mar. 5, 2014, 2 pages.
PCT/GB2013/052565—The International Bureau of WIPO, International Preliminary Report on Patentability, dated Apr. 7, 2015, 7 pages.

* cited by examiner

TURBINE WITH RADIAL INLET AND OUTLET AND MULTI-ELEMENT GUIDE VANES FOR OSCILLATING FLOWS

The present application is a national stage application of PCT Pat. App. No. PCT/GB2013/052565, filed Oct. 2, 2013, which claims priority to U.S. Patent Application Ser. No. 61/708,908, which was filed Oct. 2, 2012. These priority applications are hereby incorporated by reference in their entirety into the present application, to the extent that they are not inconsistent with the present application.

BACKGROUND

An Oscillating Water Column (OWC) is a marine renewable energy device, designed to extract power from ocean waters. Generally, the OWC includes a chamber open to the surface of the sea and a turbine. The turbine is required to convert the bi-directional airflow produced by the rising and falling sea surface within the chamber into unidirectional rotary motion, which is then used to power a generator to generate electricity. Impulse type turbines with fixed guide vanes have been developed and minimize reliability issues due to the single moving part within the OWC, the rotor. Impulse type turbines also show improved efficiency across a given operating flow rate when compared to Wells type turbines. However, the fixed guide vanes may cause an obstruction downstream of the turbine, thereby reducing efficiency.

What is needed is an OWC turbine that operates with increased efficiency and reliability.

SUMMARY

Embodiments of the disclosure may provide an oscillating water column turbine. The oscillating water column turbine may include a shaft configured to rotate about a central axis, and first and second radially-facing, annular ports disposed around the central axis. The oscillating water column turbine may also include a flow passage extending radially-inward from the first and second annular ports and extending axially therebetween. The oscillating water column turbine may further include rotor blades coupled to the shaft, intersecting the flow passage, and being offset from the central axis by a first distance. The oscillating water column turbine may also include first guide vanes intersecting the flow passage and disposed proximal the first port. The first guide vanes may include first stators and second stators, the first stators being positioned between the first port and the second stators. The first and second stators may be configured to turn a fluid flowing from the first port toward the rotor blades and may be clocked relative each other such that each of the first stators is disposed in a wake created by one of the second stators when the fluid flows from the rotor blades toward the first port. The oscillating water column turbine may further include second guide vanes intersecting the flow passage and disposed proximal the second port, the first and second guide vanes being offset from the central axis by a second distance that is greater than the first distance.

Embodiments of the disclosure may further provide an apparatus for extracting energy from a bi-directional fluid flow. The apparatus may include a shaft configured to rotate in a circumferential direction about a central axis, and a flow passage having first and second radially-extending sections and an axially-extending section disposed therebetween and around the shaft, the flow passage being configured to receive the bi-directional fluid flow. The apparatus may also include rotor blades coupled to the shaft and intersecting the axially-extending section, the rotor blades being configured to receive the bi-directional fluid flow and rotate the shaft. The apparatus may further include first guide vanes disposed in the first radially-extending section. The first guide vanes may include first and second stators configured to turn the bi-directional fluid flow when the bi-directional fluid flow proceeds in the first radially-extending section toward the rotor blades. The first stators may be clocked with respect to the second stators, such that the first stators are positioned in wakes created by the second stators when the flow proceeds from the axially-extending section and through the first radially-extending section. The apparatus may also include second guide vanes disposed in the second radially-extending section and configured to turn the bi-directional fluid flow when it proceeds in the second radially-extending section toward the axially-extending section.

Embodiments of the disclosure may further provide a method for extracting energy from an oscillating water column. The method may include receiving a fluid flow from a wave chamber through a first radially-facing port and into a flow passage, and turning the fluid flow in a circumferential direction with first guide vanes intersecting the flow passage, wherein the first guide vanes include first and second stators such that the fluid flow is turned by the first stators and then turned by the second stators. The method may also include directing the fluid flow radially-inward in the flow passage from the first guide vanes toward rotor blades coupled to a shaft and intersecting the flow passage, and turning the rotor blades by impulsive interaction between the rotor blades and the fluid flow. The method may further include directing the fluid flow radially-outward in the flow passage from the rotor blades toward second guide vanes intersecting the flow passage. The method may also include directing the fluid flow past the second guide vanes, wherein the second guide vanes include third and fourth stators, the third and fourth stators being clocked with respect to one another such that the third stators are each positioned in a wake created in the fluid flow by one of the fourth stators. The method may further include directing the fluid flow radially-outward from the second guide vanes out of the flow passage via a second radially-facing port.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

In general, FIGS. 1-4 illustrate exemplary embodiments of an oscillating water column turbine (hereinafter, "turbine") 100 with an enhanced geometry and configuration of vanes and blades. The turbine 100 defines a flow passage 104, which is an annulus of varying diameter. The flow passage 104 forms, for example, a double U-shaped cross section, as shown, with radially-oriented ports 112, 114 allowing passage of fluid to and from a wave chamber 102. This cross-section of the flow passage 104 and radial orientation of the ports 112, 114 provides a compact turbine 100. Further, rotor blades 120 are coupled to a shaft 101 and disposed proximal the middle of the flow passage 104, at an area of minimal radius of the flow passage 104. First and second rows or sets of guide vanes (hereinafter referred to simply as "first and second guide vanes") 116, 118 are disposed proximal the outer radial extents of the flow passage 104, and serve to turn fluid flow in a circumferential direction in the flow passage 104. The circumferential velocity of the flow increases by conservation of angular momentum as the fluid travels radially-inward and approaches the rotor blades 120. The first and second guide vanes 116, 118 may be segmented into first and second stators 116*a,b* and third and fourth stators 118*a,b*, respectively.

The first and second stators 116*a,b* may be shaped and positioned such that the turning of the fluid provided by each is combined during forward flow (i.e., flow toward the rotor blades 120). During reverse flow (i.e., flow away from the rotor blades 120), the shape and positioning of the first and second stators 116*a,b* reduce the obstruction to the flow passage 104, as each first stator 116*a* is shadowed in a wake created by the corresponding second stator 116*b*. Accordingly, pressure drop associated with reverse flow across the first and second stators 116*a,b* is decreased, providing increased efficiency of the turbine 100. The third and fourth stators 118*a,b* may be mirror images of the first and second stators 116*a,b* and may thus provide the same advantage. Additionally, the first guide vanes 116, second guide vanes 118, and/or rotor blades 120 may have a three-dimensional profile, such that turning is greater proximal the root thereof than at the tip thereof, as will be described in greater detail.

Figure 1:
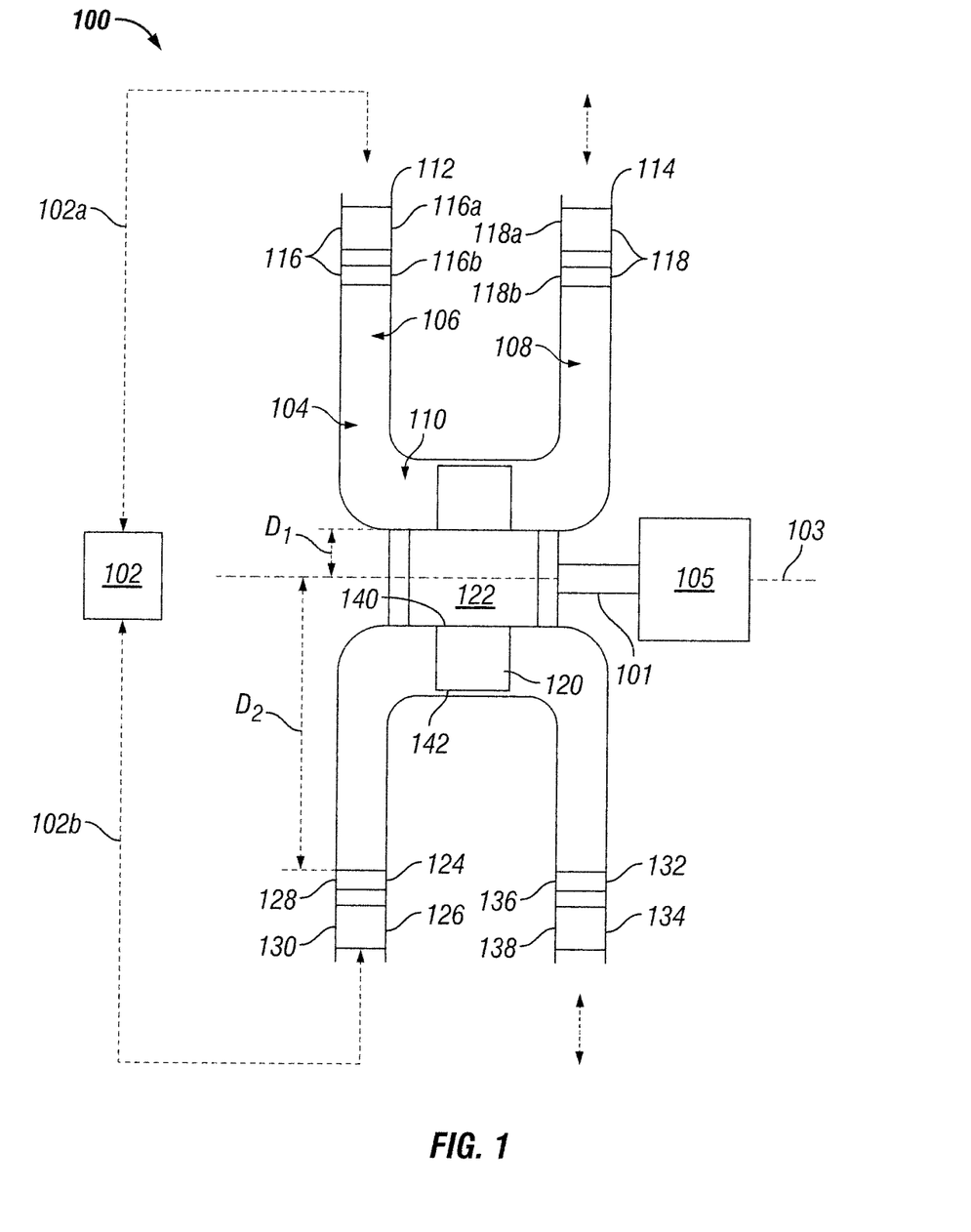
FIG. 1 illustrates a schematic view of an exemplary oscillating water column turbine, according to an embodiment.

Referring now specifically to FIG. 1, there is illustrated a schematic view of an exemplary embodiment of the turbine 100. The turbine 100 may be fluidly coupled to the wave chamber 102, as depicted by arrows 102*a,b*. The wave chamber 102 may be any wave chamber known in the art, for example, as described in either of U.S. Patent Application Publication Nos. 2010/0209236 and 2011/0252779, which are incorporated herein by reference in the entirety to the extent consistent with the present disclosure. The wave chamber 102 may be cylindrical or may be a volute, among other examples contemplated, and may have one end disposed below the surface of the water and one end above so as to house an oscillating water column therein.

The shaft 101 of the turbine 100 extends therethrough along a central axis 103, about which the shaft 101 rotates. The shaft 101 may be coupled to a generator 105, for example, directly thereto. In some embodiments, the shaft 101 may be coupled to the generator 105 via a gear box (not shown), slip coupling, or any other speed-changing device. In other embodiments, the turbine 100 may also be coupled to a compressor, pump, fan, or other type of rotating machine, with or without a gearbox and with or without a generator, as desired.

In an exemplary embodiment, the flow passage 104 is an annulus of varying diameter, and may have a double U-shaped central cross-section. As such, the flow passage 104 may generally include first and second radially-extending sections 106, 108 and an axially-extending section 110 disposed therebetween, such that the flow passage 104 is generally symmetrical about the central axis 103 of the shaft 101, a line perpendicular thereto, or both, as shown. It will be appreciated that the turbine 100 can be rotated to a horizontal configuration, or any other orientation, without departing from the scope of this disclosure. The first and second radially-extending sections 106, 108 can extend in a true radial direction, i.e., directly perpendicular to the central axis 103, as shown, or can gradually curve from straight radial to axial, while still falling within the definition of "radially-extending." Similarly, the axially-extending section 110 may extend parallel to the central axis 103 and around the shaft 101, but may also curve toward radial to seamlessly couple with the first and second radially-extending sections 106, 108, while still falling within the definition of "axially-extending."

The flow passage 104 also includes the first and second ports 112, 114, which are defined at each terminus of the flow passage 104. The first and second ports 112, 114 may be radially-facing, as shown. Further, the first and second ports 112, 114 may be disposed circumferentially around the central axis 103, so as to provide an annular inlet and outlet. As such, the first and second ports 112, 114 may define the outer radial extents of the flow passage 104.

The turbine 100 also includes at least the first guide vanes 116 positioned in the first radially-extending section 106 and the second guide vanes 118 positioned in the second radially-extending section 108. The first guide vanes 116 may be disposed closer to the first port 112 than to the central axis 103 and the second guide vanes 118 may be disposed closer to the second port 114 than to the central axis 103. As such, the first and second guide vanes 116, 118 may be described herein as being "disposed proximal" the first and second ports 112, 114, respectively. Moreover, although shown as extending entirely through the first and second radially-extending sections 106, 108, respectively, it will be appreciated that either of the first and second guide vanes 116, 118 may extend partially therethrough.

Additionally, each of the first and second guide vanes 116, 118 may be segmented into two or more adjacent stator rows. For example, the first guide vanes 116 may each be segmented into first stators 116a and second stators 116b, while the second guide vanes 118 may each be segmented into third stators 118a and fourth stators 118b. Each of the first and second stators 116a,b may define a tip 126, 124 and a root 130, 128, respectively, where the first and second stators 116a,b meet the walls of the flow passage 104. Similarly, each of the third and fourth stators 118a,b may define a root 134, 132 and a tip 138, 136, respectively.

The turbine 100 also includes rotor blades 120, which are disposed in the axially-extending section 110 of the flow passage 104. The rotor blades 120 may be impulse blades, such that the rotor blades 120 are caused to turn by impulsive interaction with the fluid flow, for example; however, reaction blades could be used without departing from the scope of the present disclosure. The rotor blades 120 extend from the shaft 101 and are coupled (e.g., welded, brazed, fastened, or integrally-formed) therewith, for example, via a hub 122. The rotor blades 120 may extend entirely or partially through the axially-extending section 110 of the flow passage 104 and are configured to rotate about the central axis 103. The rotor blades 120 may be impulse blades, configured to rotate the shaft 101 by turning the fluid and thereby absorbing the energy received via impulse with the fluid. Further, the rotor blades 120 are offset from the central axis 103 by a first distance $D_1$, which may be generally equal to the radius of the hub 122 (or the shaft 101, if the hub 122 is omitted). The first and second vanes 116, 118 may be offset from the central axis 103 by a second distance $D_2$. As shown, the second distance $D_2$ can be considerably greater than the first distance $D_1$, providing for the circumferential acceleration of the fluid flow discussed above.

Furthermore, each of the first-fourth stators 116a,b and 118a,b may define a turning angle by which the stators 116a,b and 118a,b are designed to turn the flow proceeding toward the rotor blades 120. In an exemplary embodiment, the turning angle of one, some, or all of the first-fourth stators 116a,b and 118a,b may increase proceeding from the tip 124, 126, 136, 138 toward the root 128, 130, 132, 134, thereby maximizing swirl proximal the root 128, 130, 132, 134. As such, the swirled fluid proceeding toward the rotor blades 120 may have maximum swirl at a radially-inner extent or root 140 of the rotor blade 120 and minimum swirl at a radially-outer extent or tip 142 thereof.

In operation of the exemplary turbine 100, fluid flows into or out of the wave chamber 102 as indicated by arrows 102a,b, according to whether the water level is rising ("upstroke") or falling ("downstroke") by wave action therein. During an upstroke, the first port 112 receives the fluid (e.g., air) into the first radially-extending section 106 of the flow passage 104. In the first radially-extending section 106, the fluid is turned ("swirled") to flow circumferentially by the first stators 116a and then further turned by the second stators 116b of the first guide vanes 116. The swirled fluid then proceeds radially-inward in the first radially-extending section 106. During this radially-inward travel, the circumferential component of the fluid velocity increases as the radius of the flow passage 104 decreases. The fluid then enters the axially-extending section 110 and impinges on the rotor blades 120, causing them to rotate the shaft 101.

After energy extraction in the rotor blades 120, the reduced velocity and/or pressure flow of fluid then proceeds radially-outward through the second radially-extending section 108 of the flow passage 104. The reverse effect experienced in the first radially-extending section 106 is experienced as the fluid flows radially-outward, and any circumferential velocity remaining after the fluid proceeds past the rotor blades 120 decreases as the radius of the flow passage 104 increases. The fluid then proceeds past the fourth and third stators 118b, 118a, with pressure drop being minimized by the increased radial offset of the second guide vanes 118 and the geometry and relative positioning of the third and fourth stators 118a,b, as described below. The fluid then proceeds radially-outward through the second port 114 and to the environment, a bladder, or any other suitable device, location, or structure, thereby completing the flow-path for the turbine 100 on the upstroke.

On a downstroke, the process is reversed, but is otherwise generally the same. The fluid flows into the flow passage 104 through the second port 114 and is turned by the second guide vanes 118 such that a circumferential swirl is imparted. The circumferential swirl imparted by the second guide vanes 118 may be oriented in the same circumferential direction as the swirl imparted by the first guide vanes 116 during the upstroke. The reverse flow of fluid then impinges on the rotor blades 120, flows out of the flow passage 104 via the first port 112, and back into the wave chamber 102, as indicated by arrows 102a,b.

Figure 2:
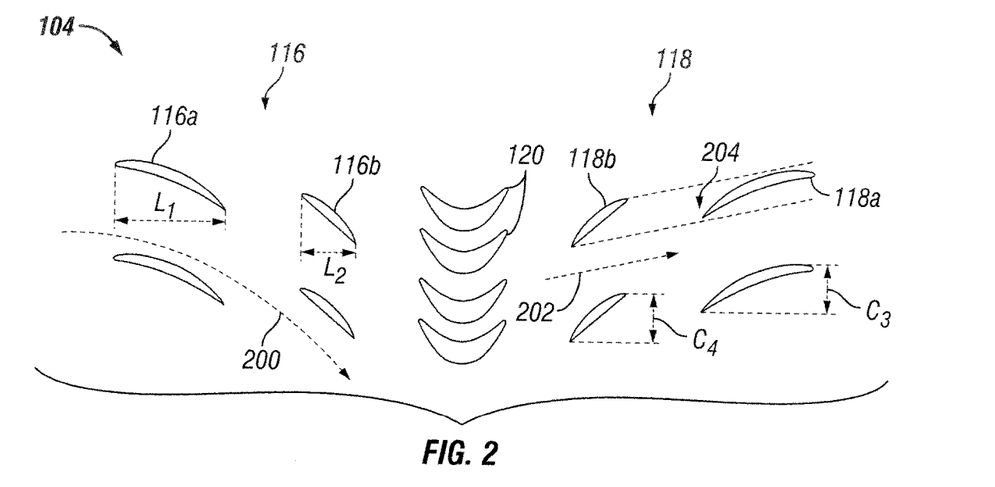
FIG. 2 illustrates a schematic view of exemplary turbine blades and exemplary guide vanes for use in an oscillating water column turbine, according to an embodiment.

FIG. 2 illustrates a schematic of an exemplary embodiment of the first and second guide vanes 116, 118 and the rotor blades 120 in the flow passage 104. The first and second guide vanes 116, 118 will be described with reference to the upstroke, with fluid proceeding past the first guide vanes 116 toward the rotor blades 120, past the rotor blades 120, and then past the second guide vanes 118. However, the first and second guide vanes 116, 118 may be mirror images of one another, and, as such, the discussion of the first guide vanes 116 may apply equally to the second guide vanes 118 during the downstroke, with the fluid flow direction reversed, and vice versa.

As noted above, the first guide vanes 116 may be segmented into first and second stators 116a,b, with the first stators 116a being disposed upstream of the second stators 116b. Accordingly, the first stators 116a begin the turning of the fluid flowing past, as indicated by arrow 200, and then the fluid passes to the second stators 116b, where it is further turned. The turning requirement for each stator 116a,b is, therefore, less than the total turning required. This enables the axial chord lengths $L_1$, $L_2$ of the first and second stators 116a,b, respectively, to be less than would be required for a single stator. The combined axial chord length ($L_1+L_2$) for the first and second stators 116a,b together may, however, be longer than would be required for a single stator.

During reverse flow, as shown for the third and fourth stators 118a,b, the clocking, profile, and chord lengths of the stators 116a,b and 118a,b maximize reverse flow area resulting in reduced pressure losses. As indicated by arrow 202, fluid exits the rotor blades 120 and proceeds through the flow passage 104 to the fourth stators 118b. The fourth stators 118b, being designed to turn the fluid during forward flow (i.e., in the opposite direction), obstruct the reverse flow 202 and create wakes, schematically indicated as 204, which are areas of low pressure in the reverse flow 202. The fourth stator 118b, however, may have a small circumferential chord length $C_4$ when compared to the circumferential chord length $C_3$ of the third stator 118a, since the fourth stator 118b is not required to do the bulk of the turning during forward flow. As such, the obstruction to the reverse flow 202 is reduced, thereby minimizing the wake 204 size and maximizing free flow area for the reverse flow 420.

Further, the turning requirement of the third and fourth stators 118a,b may be distributed so that the circumferential chord length $C_3$ and $C_4$ of the third and fourth stators 118a,b, respectively, may be approximately the same. This may allow the third stators 118a to be positioned or clocked with respect to the fourth stators 118b, such that the third stators 118a reside in the wake 204 created by the fourth stator 118b. Therefore, the third stator 118a does not add to the wake 204 or otherwise significantly increase fluid flow obstruction, but allows the free flow area of the reverse flow 420 to be maximized, thereby reducing pressure drop. Additionally, spacing between the first and second stators 116a,b may be greater than one axial chord length $L_1$ of the first stators 116a to minimize interference between the first and second stators 116a,b during forward flow.

Figure 3:
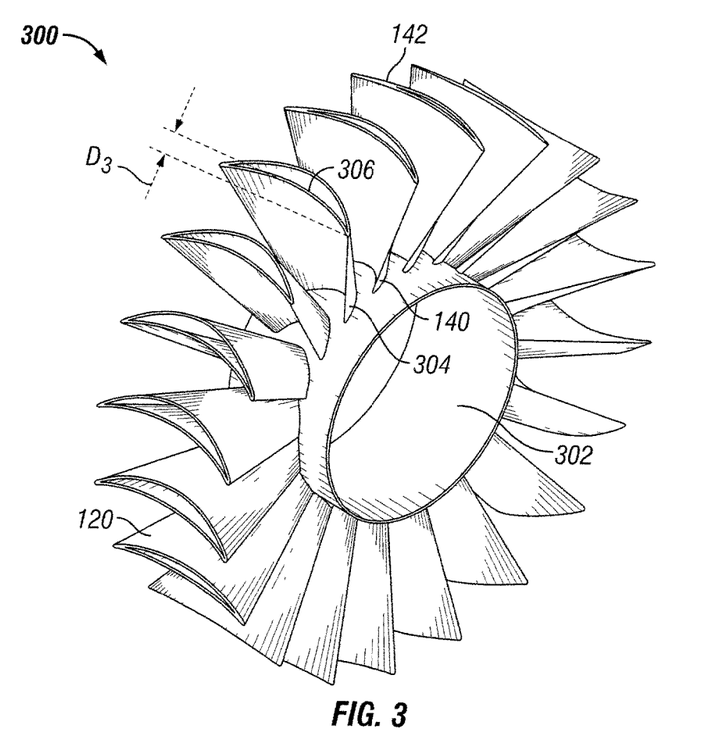
FIG. 3 illustrates a perspective view of an exemplary rotor blade wheel for use in the oscillating water column turbine, according to an embodiment.

FIG. 3 illustrates an exemplary rotor blade wheel 300, according to an embodiment. The rotor blade wheel 300 includes the rotor blades 120, which extend radially from an inner endwall 302. The rotor blades 120 may be coupled at their roots 140 to the inner endwall 302, for example, via dovetail or fir-tree fitting, welding, brazing, fastening, or any other suitable coupling arrangement or method, including integral formation. Further, the inner endwall 302 may be integral with the hub 122 or may be otherwise coupled thereto. In some embodiments, the inner endwall 302 may be provided in lieu of the hub 122 and may be coupled directly to the shaft 101 (FIG. 1). Although not shown, the rotor blade wheel 300 may be shrouded, such that an annular ring (not shown) extends around, between and/or connects together the tips 142.

Each rotor blade 120 defines a profile (i.e., shape), which may be tailored to efficiently capture energy from a fluid flow. In an exemplary embodiment, the profile of the rotor blades 120 may vary proceeding in three-dimensions. More particularly, the rotor blades 120 have a generally crescent shape, as shown, providing two-dimensions of shape. The rotor blades 120 may vary in turning angle from root 140 to tip 142, providing the third-dimension of shape. The variance in turning angle may depend, for example, on the design and height of the rotor. As shown, the circumferential chord length D (i.e., the distance from a point on the edge 304 to a point on the rotor blade 120 at the axial middle 306 thereof and at an equal distance from the root 140) may increase proceeding from the tip 142 toward the root 140. This varying circumferential chord length D may assist in eliminating separation on the rotor blade 120 and enable the rotor blades 120 to produce a non-axial downstream flow, as proceeding toward the guide vanes (either first or second guide vanes 116, 118 as shown in and described above with respect to FIGS. 1 and 2), which may allow for less separation and hence reduce pressure loss when the non-axial downstream flow reaches the guide vanes, thereby providing for more efficient passing thereof and an increase in efficiency.

Figure 4:
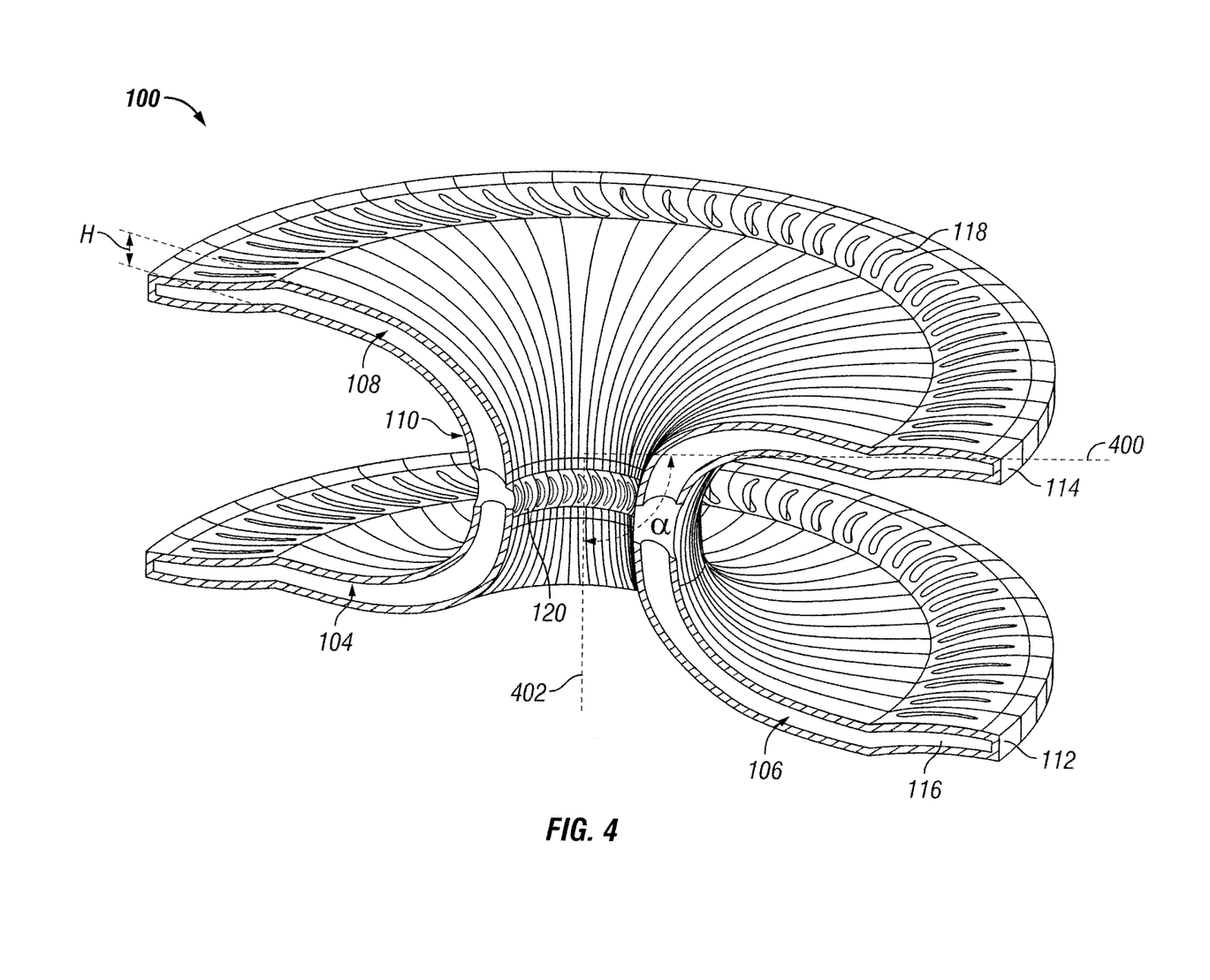
FIG. 4 illustrates a perspective, sectional view of the exemplary oscillating water column turbine, according to an embodiment.

FIG. 4 illustrates a perspective, sectional view of the exemplary turbine 100, according to an embodiment. Unitary or non-segmented embodiments of the first and second guide vanes 116, 118 are shown for ease of illustration; however, it will be appreciated that one or both of the first and second guide vanes 116, 118 may be segmented and combined with any of the features of the embodiment illustrated in FIG. 4. Each of the first and second guide vanes 116, 118 may define a mid-span plane, for example, as represented by line 400. Similarly, each rotor blade 120 may define a mid-span plane, for example, as represented by line 402. When extended past the boundaries of the rotor blades 120 and the first and second guide vanes 116, 118, the lines 400 and 402 intersect to define an angle α, which is indicative of the relative angle of orientation of the rotor blades 120 and guide vanes 116, 118. Considering each half of the turbine 100 separately, the angle α may be substantially constant between each of the guide vanes 116, 118 and rotor blades 120, or may vary as deemed optimal by one with skill in the art. For example, the angle α may be between about 0 degrees, about 15, degrees, about 30 degrees, about 45 degrees, and about 60 degrees, about 75 degrees, or about 90 degrees.

Further, an exemplary embodiment of the contours of the flow passage 104 is illustrated in FIG. 4. As shown, the flow passage 104 may extend radially inward from the first port 112 and past the first guide vanes 116. The flow passage 104 may then gradually turn from radial to axial, while approaching the rotor blades 120. Beyond the rotor blades 120, the flow passage 104 may again turn radially-outward, proceeding toward the second guide vanes 118 and thereafter to the second port 114. Furthermore, in an exemplary embodiment, the flow passage 104 may have a variable height H. As shown, the height H may increase proceeding from the radial-outermost extremes of the flow passage 104, proximal the first and second ports 112, 114, to a maximum proximal the rotor blades 120.

Figure 5:
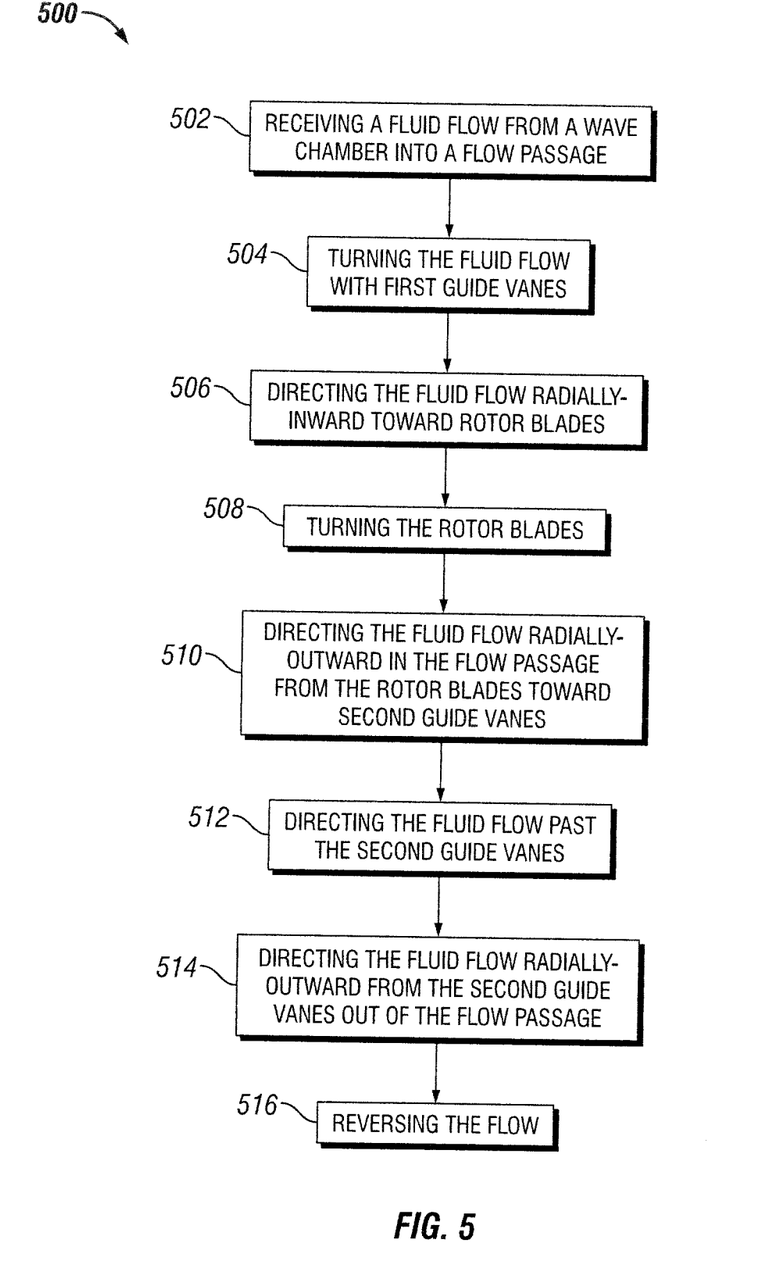
FIG. 5 illustrates a flowchart of an exemplary method for extracting energy from an oscillating water column, according to an embodiment.

FIG. 5 illustrates a flowchart of an exemplary method 500 for extracting energy from an oscillating water column, according to an embodiment. The method 500 may proceed by operation of the turbine 100 and may thus be best understood with reference thereto. The method 500 may include receiving a fluid flow from a wave chamber through a first radially-facing port and into a flow passage, as at 502. The method 500 may also include turning the fluid flow in a circumferential direction with first guide vanes intersecting the flow passage, as at 504. In an exemplary embodiment, the first guide vanes include first and second adjacent stators such that the fluid flow is turned by the first stators and then turned by the second stators.

The method 500 may also include directing the fluid flow radially-inward in the flow passage from the first guide vanes toward rotor blades coupled to a shaft and intersecting the flow passage, as at 506. The method 500 may further include turning the rotor blades by impingement with the fluid flow, as at 508. The method 500 may then include directing the fluid flow radially-outward in the flow passage from the rotor blades toward second guide vanes intersecting the flow passage, as at 510. The method 500 may also include directing the fluid flow past the second guide vanes, as at 512. In an exemplary embodiment, the second guide vanes include third and fourth stators, with the third and fourth stators being clocked with respect to one another such that the third stators are each positioned in a wake created in the fluid flow by one of the fourth stators. The method 500 may also include directing the fluid flow from radially-outward from the second guide vanes out of the flow passage via a second radially-facing port, as at 514.

The method 500 may also include reversing the flow just described, as at 516. As such, the method 500 may include receiving a second fluid flow (i.e., a flow in a second, reversed direction, with respect to the first fluid flow) into flow passage via the second radially-facing port, and turning the second fluid flow in the circumferential direction with the third and fourth stators. The method 500 may also include directing the second fluid flow radially inward toward the rotor blades, and turning the rotor blades by impingement with the second fluid flow. The method 500 may further include directing the second fluid flow radially-outward toward the first guide vanes, and directing the second fluid flow past the first and second stators. In an exemplary embodiment, the first and second stators are clocked with respect to one another such that the first stators are each positioned in a wake created in the second fluid flow by one of the second stators. The method 500 may also include directing the fluid flow from the first radially-extending section through the first radially-facing port and into the wave chamber.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:
1. An oscillating water column turbine, comprising:
a shaft configured to rotate about a central axis;
first and second radially-facing, annular ports, the first and second ports disposed around the central axis;
a flow passage extending radially-inward from the first and second annular ports and extending axially therebetween;
rotor blades coupled to the shaft, intersecting the flow passage, and being offset from the central axis by a first distance;
first guide vanes intersecting the flow passage and disposed proximal the first port, the first guide vanes including first stators and second stators, the first stators being positioned between the first port and the second stators, the first and second stators being configured to turn a fluid flowing from the first port toward the rotor blades and being clocked relative each other such that each of the first stators is disposed in a wake created by one of the second stators when the fluid flows from the rotor blades toward the first port; and second guide vanes intersecting the flow passage and disposed proximal the second port, the first and second guide vanes being offset from the central axis by a second distance that is greater than the first distance.

2. The oscillating water column turbine of claim 1, wherein the flow passage has a substantially double U-shaped profile.

3. The oscillating water column turbine of claim 1, wherein the flow passage has a height that is greater proximal the rotor blades than proximal the first port.

4. The oscillating water column turbine of claim 1, wherein a mid-span plane of the first guide vanes and a mid-span plane of the rotor blades intersect to form an angle of between about 0 degrees and about 90 degrees.

5. The oscillating water column turbine of claim 1, wherein each of the rotor blades has a root disposed proximal the shaft and a tip disposed distal the shaft, wherein a turning angle of each of the rotor blades increases proceeding from the tip to the root.

6. The oscillating water column turbine of claim 1, wherein the second guide vanes include third and fourth stators, the third stators being positioned between the second port and the fourth stators, the third and fourth stators being configured to turn fluid flowing from the second port toward the rotor blades and being clocked relative each other, such that each of the third stators is disposed in a wake created by one of the fourth stators when the fluid flows from the rotor blades toward the second port.

7. The oscillating water column turbine of claim 1, wherein the first and second stators are spaced apart by at least one axial chord length of one of the first stators.

8. The oscillating water column turbine of claim 1, wherein the first stators, the second stators, or both are twisted such that a turning angle thereof varies between a root and a tip thereof.

9. The oscillating water column turbine of claim 1, wherein the first and second stators have substantially equal circumferential chord lengths.

10. The oscillating water column turbine of claim 1, wherein the first stators turn the fluid proceeding from the first port toward the rotor blades to a greater extent than do the second stators.

11. An apparatus for extracting energy from a bi-directional fluid flow, comprising:
a shaft configured to rotate in a circumferential direction about a central axis;
a flow passage having first and second radially-extending sections and an axially-extending section disposed therebetween and around the shaft, the flow passage being configured to receive the bi-directional fluid flow;
rotor blades coupled to the shaft and intersecting the axially-extending section, the rotor blades being configured to receive the bi-directional fluid flow and rotate the shaft;
first guide vanes disposed in the first radially-extending section, the first guide vanes including first and second stators configured to turn the bi-directional fluid flow when the bi-directional fluid flow proceeds in the first radially-extending section toward the rotor blades, the first stators being clocked with respect to the second stators, such that the first stators are positioned in wakes created by the second stators when the flow proceeds from the axially-extending section and through the first radially-extending section; and
second guide vanes disposed in the second radially-extending section and configured to turn the bi-directional fluid flow when it proceeds in the second radially-extending section toward the axially-extending section.

12. The apparatus of claim 11, wherein the second guide vanes include third and fourth stators, the fourth stators being positioned between the rotor blades and the third stators, the third stators being clocked relative to the fourth stators such that each of the third stators are disposed in wakes created by the fourth stators when fluid flows from the axially-extending section and through the second radially-extending section of the flow passage.

13. The apparatus of claim 11, wherein the first and second guide vanes are offset from the central axis by a first distance and the rotor blades are offset from the central axis by a second distance, the first distance being greater than the second distance.

14. The apparatus of claim 11, further comprising first and second radially-facing ports disposed around the central axis, the first port defining an outer radial extent of the first radially-extending section and the second port defining an outer radial extent of the second radially-extending section.

15. The apparatus of claim 11, wherein the first and second radially-extending sections are mirror images of each other.

16. The apparatus of claim 11, wherein each of the rotor blades has a root disposed proximal the shaft and a tip disposed distal the shaft, a turning angle of each rotor blade increasing as proceeding from the tip to the root.

17. The apparatus of claim 11, wherein the first and second stators are spaced apart by at least one axial chord length of one of the first stators.

18. The apparatus of claim 11, wherein the first stators, the second stators, or both are twisted such that a turning angle thereof varies.

19. A method for extracting energy from an oscillating water column, comprising:
receiving a fluid flow from a wave chamber through a first radially-facing port and into a flow passage;
turning the fluid flow in a circumferential direction with first guide vanes intersecting the flow passage, wherein the first guide vanes include first and second stators such that the fluid flow is turned by the first stators and then turned by the second stators;
directing the fluid flow radially-inward in the flow passage from the first guide vanes toward rotor blades coupled to a shaft and intersecting the flow passage;
turning the rotor blades by impulsive interaction between the rotor blades and the fluid flow;
directing the fluid flow radially-outward in the flow passage from the rotor blades toward second guide vanes intersecting the flow passage;
directing the fluid flow past the second guide vanes, wherein the second guide vanes include third and fourth stators, the third and fourth stators being clocked with respect to one another such that the third stators are each positioned in a wake created in the fluid flow by one of the fourth stators; and
directing the fluid flow radially-outward from the second guide vanes out of the flow passage via a second radially-facing port.

20. The method of claim 19, further comprising:
receiving a second fluid flow into the flow passage via the second radially-facing port;
turning the second fluid flow in the circumferential direction with the third and fourth stators;
directing the second fluid flow radially inward toward the rotor blades;
turning the rotor blades by impingement with the second fluid flow;
directing the second fluid flow radially-outward toward the first guide vanes;
directing the second fluid flow past the first and second stators, the first and second stators being clocked with respect to one another such that the first stators are each positioned in a wake created in the second fluid flow by one of the second stators; and
directing the fluid flow from the first radially-extending section through the first radially-facing port and into the wave chamber.

* * * * *